United States Patent [19]

Harita et al.

[11] Patent Number: 5,300,354

[45] Date of Patent: Apr. 5, 1994

[54] MULTI-LAYER CONSTRUCTION FILM

[75] Inventors: Shigeyuki Harita; Susumu Fukutome; Satoshi Hirofuji, all of Kurashiki, Japan

[73] Assignee: Kuraray Co., Ltd., Kurashiki, Japan

[21] Appl. No.: 854,894

[22] Filed: Mar. 20, 1992

[30] Foreign Application Priority Data

Mar. 20, 1991 [JP] Japan .................................. 3-82000

[51] Int. Cl.$^5$ ...................... B32B 17/10; B32B 15/08; B32B 27/30; B65D 65/40
[52] U.S. Cl. ................................ 428/215; 428/476.3; 428/483; 428/516; 428/518
[58] Field of Search .................... 428/215, 476.3, 483, 428/516, 518

[56] References Cited

U.S. PATENT DOCUMENTS

| | | | |
|---|---|---|---|
| 4,477,532 | 10/1984 | Schmukler et al. | 428/441 |
| 4,608,286 | 8/1986 | Motoishi et al. | 428/35 |
| 4,640,870 | 2/1987 | Akazawa et al. | 428/483 |
| 4,684,564 | 8/1987 | Satoh et al. | 428/216 |
| 4,719,153 | 1/1988 | Akazawa et al. | 428/515 |
| 4,810,581 | 3/1989 | Akazawa et al. | 428/412 |
| 4,810,755 | 3/1989 | Akazawa et al. | 525/285 |

FOREIGN PATENT DOCUMENTS

| | | |
|---|---|---|
| 0247326 | 12/1987 | European Pat. Off. |
| 0326827 | 8/1989 | European Pat. Off. |
| 3504349 | 8/1985 | Fed. Rep. of Germany |
| 51-18775 | 2/1976 | Japan |
| 52-119690 | 10/1977 | Japan |
| 57-182435 | 11/1982 | Japan |
| 1567189 | 5/1980 | United Kingdom |
| 2106471A | 4/1983 | United Kingdom |

OTHER PUBLICATIONS

Patent Abstracts of Japan, Sep. 28, 1989, & JP-A-1-1-066951, Jun. 30, 1989, K. Isao, et al., "Laminated Body".

Primary Examiner—P. C. Sluby
Attorney, Agent, or Firm—Oblon, Spivak, McClelland, Maier & Neustadt

[57] ABSTRACT

A multi-layer construction film comprising at least one layer (A) of ethylene-vinyl alcohol copolymer and having an ethylene content of 20–60 mol %, and a melt index of $\eta$ Eg/10 min., at least one adhesive resin layer (B) of ethylene polymer and having a melt index of $\eta$ Ag/10 min. and density of not more than 0.90 g/cm$^3$, and a plastic film (C) wherein the layer (B) is laminated adjacent to the plastic film (C), which satisfies the following formulas.

$$0.5 \ \mu m \leq a \leq 20 \ \mu m \quad (1)$$

$$0.5 \ \mu m \leq b' \leq 20 \ \mu m \quad (2)$$

$$1 \ \mu m \leq a+b \leq 30 \ \mu m \quad (3)$$

$$0.08 \leq \eta \ E/\eta \ A \leq 8 \quad (4)$$

wherein a is the thickness of the entire layer (A), b is the thickness of the entire layer (B), and b' is the thickness of one layer of layer (B), and a method for producing same. The multi-layer construction film of the present invention has gas barrier properties, flex resistance, and resistance to boiling, and does not yellow at ultraviolet rays.

7 Claims, No Drawings

MULTI-LAYER CONSTRUCTION FILM

FIELD OF THE INVENTION

The present invention relates to a multi-layer construction film having gas barrier properties, flex resistance, and resistance to boiling, which does not yellow at ultraviolet rays.

BACKGROUND OF THE INVENTION

Traditionally, backing films such as biaxially stretched polypropylene films (hereinafter abbreviated as OPP), biaxially stretched polyamide films (hereinafter abbreviated as OPA), and biaxially stretched polyethylene terephthalate films (hereinafter abbreviated as PET) which are superior in transparency, mechanical strength, price, etc. are laminated with polyolefin films for imparting heat sealing property, and used as packaging materials for various uses such as for foods, medicines, and so on. However, these films are poor in gas barrier properties, which in turn results in such poor storage of contents as exemplified by molding on the contents, volatilization of the contents, oxidation of fats and oils, and degradation of flavor. Accordingly, an improvement in gas barrier properties is desired.

Improvement of the gas barrier properties can be achieved by coating a latex of a vinylidene chloride-vinyl chloride copolymer or a solution of a vinylidene chloride-acrylonitrile copolymer on a film (commercially available from various companies as PVDC coated films), and by laminating the film with a film made of ethylene-vinyl alcohol copolymer (hereinafter abbreviated as EVOH) or a film made of poly(vinyl alcohol) (hereinafter abbreviated as PVA). However, PVDC coated films are yellowy as they originally are, and can be further yellowed by ultraviolet rays.

On the other hand, laminates of films of EVOH and PVA are colorless and transparent, and do not yellow at ultraviolet rays. However, they have defects in that they cost higher, they have poor flex resistance due to the hardness of the film, and delamination tends to occur upon boil-treatment at high temperature.

Japanese Patent Unexamined Publication No. 18775/1976 discloses a method for producing a laminated film, which comprises laminating a thin molten film consisting of at least two layers with one layer being EVOH, with a backing film by contact bonding. However, while this invention teaches coating of an isocyanate adhesive (adhesion promoter) for the adhesion between the backing film and a co-extrusion coating layer in Examples thereof, it does not teach co-extrusion coating without an adhesion promoter. For using an adhesion promoter, a coater and a drying machine will be necessary. Then, the equipment becomes complicated, the cost becomes higher, and high-speed operation becomes unattainable. In addition, this invention does not teach that a multi-layer construction film having a flex resistance as measured by Gelbo flex tester (an equipment according to Military standard, MIL-B-131G, METHOD 2017) similar to that of the backing film can be obtained by laminating an adhesive resin having a density of not higher than 0.90 g/cm³ which is made of ethylene polymer, and an EVOH having a ratio of melt index in a specific range at a specific layer thickness, and by reducing the thickness of not only the EVOH layer but also the adhesive resin layer. On the contrary, this invention teaches that the adhesive resin layer should be made thicker for the adhesion with the film, since heat capacity of the molten resin needs to be increased.

Japanese Unexamined Patent Publication No. 119690/1977 discloses a laminated material comprising a thermoplastic resin layer having a tensile modulus of not more than 100 kg/mm² between a paper layer and an EVOH layer. While this invention teaches adhesion of the paper layer and the EVOH layer, it does not teach that of plastic films. In addition, this invention has no disclosure as regards laminating without an adhesion promoter, or flex resistance.

Japanese Unexamined Patent Publication No. 182435/1982 discloses a method for producing a laminate composed of polyolefin layer/modified polyolefin layer made of carboxyl group-containing polyolefin or those obtained by adding a metal compound to the carboxyl group-containing polyolefin/EVOH layer/adhesive layer/polyolefin layer, which comprises melt extrusion or co-extrusion of one to three layers of EVOH, modified polyolefin and EVOH, EVOH and adhesive, and modified polyolefin and EVOH and adhesive, for sandwich laminating. However, this invention does not describe co-extrusion coating or flex resistance.

As mentioned above, a low-cost multi-layer construction film having gas barrier properties, flex resistance, and resistance to boiling, which is scarcely yellowed by ultraviolet rays is desired in this industrial field.

SUMMARY OF THE INVENTION

An object of the present invention is to provide a low-cost multi-layer construction film having gas barrier properties, flex resistance, and resistance to boiling, which is scarcely yellowed by ultraviolet rays.

The present inventors have conducted intensive studies noting the above-described problems, and found that a multi-layer construction film comprising at least one layer (A) of ethylene-vinyl alcohol copolymer and having an ethylene content of 20–60 mol % and a melt index of $\eta Eg/10$ min., at least one adhesive resin layer (hereinafter abbreviated as APO) (B) of ethylene polymer and having a melt index of $\eta Ag/10$ min. and a density of not more than 0.90 g/cm³, and a plastic film (C), wherein the layer (B) is laminated adjacent to the plastic film (C), which satisfies the following formulas has gas barrier properties, flex resistance, and resistance to boiling, and is scarcely yellowed by ultraviolet rays. With this finding, the present invention was developed.

$$0.5\ \mu m \leq a \leq 20\ \mu m \ldots \tag{1}$$

$$0.5\ \mu m \leq b' \leq 20\ \mu m \ldots \tag{2}$$

$$1\ \mu m \leq a+b \leq 30\ \mu m \ldots \tag{3}$$

$$0.08 \leq \eta E/\eta A \leq 8 \ldots \tag{4}$$

wherein a is the thickness of the entire layer (A), b is the thickness of the entire layer (B), and b' is the thickness of one layer of layer (B).

The present inventors have also found that multi-layer construction films can be obtained at high speed by co-extrusion coating of a molten multilayered polymer containing at least one layer (A) and at least one layer (B), which satisfies the above-mentioned formula (4), with a plastic film (C), in a manner that the layer (B) is laminated adjacent to the plastic film (C), and in particular, that multi-layer construction films having gas barrier properties, flex resistance, and resistance to boiling, which are scarcely yellowed by ultraviolet rays can be obtained at high speed by satisfying the above-mentioned formulas (1), (2), and (3).

DETAILED DESCRIPTION OF THE INVENTION

The present invention is detailedly described in the following. In the present invention, EVOH can be obtained by a polymerization of ethylene and vinyl ester under pressure in a solvent such as methanol and t-butyl alcohol in the presence of a polymerization initiator such as benzoyl peroxide and azobisisobutyronitrile by a known method, followed by saponification using an acid or an alkali catalyst. As the vinyl ester, usable are various fatty acid vinyl esters such as vinyl acetate, vinyl propionate, vinyl versatate and vinyl pivalate, vinyl benzoate, and so on, with preference given to vinyl acetate from the aspect of cost, and also to vinyl pivalate from the aspect of gas barrier properties. The ethylene content of EVOH is from 20 to 60 mol %, preferably from 20 to 50 mol %, and the degree of saponification of the fatty acid vinyl ester component is not less than 90 mol %, preferably not less than 95 mol %. Where the ethylene content is less than 20 mol %, gas barrier properties under high humidity becomes lower. On the other hand, where it is more than 60 mol %, sufficient gas barrier properties cannot be obtained. The degree of saponification of less than 90 mol % causes not only a decreased gas barrier properties under high humidity but also less thermal stability of EVOH, which results in occurrence of gel on the film surface obtained.

The EVOH may contain a small amount of $\alpha$-olefin such as propylene, isobutene, 4-methylpentene-1, hexene and octene, unsaturated carboxylic acid such as itaconic acid, methacrylic acid, acrylic acid and maleic acid, their salts, their partial or complete esters, their nitriles, their amides, their anhydrides, vinylsilane compounds such as vinyltrimethoxysilane, unsaturated sulfonic acids, their salts, alkyl thiols, and N-vinyl pyrrolidone as a copolymerized component.

The EVOH may be a mixture of two or more of EVOHs having different ethylene copolymerization ratios, or may be a mixture of two or more of EVOHs having different copolymerization degrees. Further, EVOHs may have different ethylene copolymerization ratios and different polymerization degrees, and also, the EVOH may be a multilayered polymer of two or more of those described above.

The EVOH may contain various additives such as antioxidants, colorants, ultraviolet absorbers, slipping agents, antistatic agents, plasticizers, crosslinking agents such as boric acid, inorganic fillers, and inorganic desiccants, and various resins such as polyamides, polyolefins, and highly water-absorbable resins to the extent that they do not adversely affect the present invention.

In the present invention, APO is a polymer produced by subjecting a copolymer obtained by a polymerization of ethylene as the main component, and one or more of $\alpha$-olefin having carbon atoms of not less than 3, preferably 3-10, such as propylene, butene, isobutene, 4-methylpentene, hexene and octene, or butadiene with the use of a chromium catalyst or Ziegler type catalyst under a pressure of 7-45 kg/cm$^2$ at 75°-100° C. by the liquid phase solution method, liquid phase slurry method, gas phase fluidized bed method, or gas phase stirred bed method, or by subjecting a copolymer obtained by a polymerization of ethylene as the main component, and one or more of vinyl acetate, acrylic ester, methacrylic acid, etc. with the use of a free-radical catalyst under a pressure of 2000-3000 kg/cm$^2$ at 120°-250° C. as in the regular polymerization of a low-density polyethylene, by the gas phase fluidized bed method, or gas phase stirred bed method, to a graft modification using one or more of unsaturated carboxylic acids or their anhydrides such as maleic anhydride, maleic acid, itaconic anhydride, acrylic acid and methacrylic acid, in the presence of a radical polymerization initiator (e.g. 0.1 weight % of 2,5-dimethyl-2,5-di(tertiary-butylperoxy)hexane-3) in a polymerization tank or extruder at 200°-240° C. The copolymerization ratio of ethylene in the copolymer is preferably 10–40 mol %, and the degree of modification by the unsaturated carboxylic acid or its anhydride is preferably 0.005-7 wt % based on the weight of the copolymer. The preferable one among the above polymers is a copolymer of ethylene and one or more of $\alpha$-olefin, propylene, butene, and 4-methylpentene (copolymerization ratio, ethylene: 60-90 mol %, and $\alpha$-olefin: 40-10 mol %, preferably ethylene 70-85 mol %, and $\alpha$-olefin 30-15 mol %), which has been subjected to a graft modification using maleic anhydride (degree of modification: 0.005-7 weight %, preferably 0.02-5 weight %), which has a density of not more than 0.90 g/cm$^3$, preferably not more than 0.89 g/cm$^3$. With a density exceeding 0.90 g/cm$^3$, adhesiveness with the plastic film (C) upon co-extrusion coating reduces so that an adhesion promoter becomes necessary. Also, sufficient adhesion with the plastic film cannot be obtained when EVOH is subjected to a co-extrusion coating in direct contact with the plastic film without an adhesion promoter. The density here is a value according to ASTM-D-1505.

The APO may contain various additives such as antioxidants, colorants, ultraviolet absorbers, slipping agents, antistatic agents, plasticizers, crosslinking agents, inorganic fillers, and inorganic desiccants, and various resins such as thermoplastic resins to the extent that they do not adversely affect the present invention.

In the present invention, it is critical to satisfy the following mathematical expressions wherein the thickness of the entire EVOH layer is a $\mu$m, the thickness of the entire APO layer is b $\mu$m, and the thickness of one layer of layer (B) is b' $\mu$m.

$$0.5 \ \mu m \leq a \leq 20 \ \mu m \quad (1)$$

$$0.5 \ \mu m \leq b' \leq 20 \ \mu m \quad (2)$$

$$1 \ \mu m \leq a+b \leq 30 \ \mu m \quad (3)$$

which are preferably $$0.5 \ \mu m \leq a \leq 15 \ \mu m \quad (5)$$

$$0.5 \ \mu m \leq b' \leq 15 \ \mu m \quad (6)$$

$$1 \ \mu m \leq a+b \leq 25 \ \mu m \quad (7)$$

and more preferably $$1 \ \mu m \leq a \leq 10 \ \mu m \quad (8)$$

$$1 \ \mu m \leq b' \leq 10 \ \mu m \quad (9)$$

$$2 \ \mu m \leq a+b \leq 20 \ \mu m \quad (10)$$

Where the thickness (a) of the entire EVOH layer is less than 0.5 μm, sufficient gas barrier properties cannot be obtained. On the other hand, where it is more than 20 μm, flex resistance of the multi-layer construction film becomes less. Where the thickness (b') of one layer of APO is less than 0.5 μm, sufficient adhesion between the layers cannot be obtained without an adhesion promoter. On the other hand, where it is more than 20 μm, transparency of the multi-layer construction film becomes less, and so does the economic productivity. Furthermore, where the total of the thickness of the entire EVOH layer and that of the entire APO layer (a+b) is less than 1 μm, the stability of the molten multilayered film becomes poor, which can cause crack of the film. On the other hand, where it is more than 30 μm, the flex resistance of the multi-layer construction film becomes poor, and so does the economic productivity. By satisfying all the conditions as described above, a multi-layer construction film superior in productivity, economic feasibility, and strength can be obtained.

In order to obtain a thin co-extrusion coated film which has a uniform thickness distribution of each layer and the entire layer to the width direction, it is critical to select a melt index (weight delivered from a nozzle having a radial diameter of 1 mm at 230° C. and 2160 g load for 10 minutes in accordance with JIS K 7210, hereinafter abbreviated as MFR) of EVOH (or blended EVOH when EVOH is a blended mixture) to APO from the range specified by $0.08 \leq \eta E/\eta A \leq 8$, preferably $0.1 \leq \eta E/\eta A \leq 5$, and more preferably $0.2 \leq \eta E/\eta A \leq 3$, wherein MFR of EVOH is $\eta E$ g/10 min. and MFR of APO is $\eta A$ g/10 min. Where $\eta E/\eta A$ is less than 0.08 or more than 8, thick spots in the width direction, woodgrain patterns, or satin can be brought out on the co-extrusion coated film, which makes its appearance poor and thinning unattainable. With other type of equipment such as dual slot die, etc., each layer cannot be made uniformly thin. It is desirable that the feed block available from Cloren Corp. which is equipped with pins and vanes in each flow path of EVOH (A) and APO (B), and is superior in the adjustment of thickness should be used. By employing the aforementioned conditions, multi-layer construction films having a uniform thickness of each layer can be obtained at high speed.

In the present invention, the plastic film (C) is subject to no particular limitation, but preferred are biaxially stretched polypropylene films having an orientation ratio (area) of not less than 10 times, biaxially stretched or rolled high-density polyethylene films having an orientation ratio (area) of not less than 4 times, biaxially stretched polyamide films having an orientation ratio (area) of not less than 4 times, and biaxially stretched polyethylene terephthalate films having an orientation ratio (area) of not less than 4 times in view of printability, practical strength, and economic feasibility. These plastic films may be printed or plain.

In the present invention, the flex resistance (number of flexings d necessary for the occurrence of one pinhole upon flexing at 20° C. as measured by Gelbo flex tester) of the multi-layer construction film obtained by co-extrusion coating is desirably 0.5 time that (number of flexings c) of the plastic film (C) or more, namely, it is desirable to satisfy $0.5 \times c \leq d$, preferably 0.7 time or more, and more preferably 0.8 time or more. In general, those having a fine flex resistance which are greater in number of flexings show less likelihood of the occurrence of pinholes by vibration during transportation, whereas when laminated, they tend to show less flex resistance.

The multi-layer construction film of the present invention obtained by co-extrusion coating may be used as a packaging material as it is. However, sufficient heat-sealing strength is sometimes difficult to achieve. Therefore, a heat-sealing layer made of a plastic and having a Vicat softening point as measured by the method described in JIS K 7206, of 15° C. or more, preferably 25° C. or more lower than that of the plastic film (C) may be laminated on the side which may be printed and is opposite to the (C) layer, or a heat-sealing layer made of a plastic having a Vicat softening point lower than that of the EVOH (A) may be laminated on the side of the (C) layer, which may be printed, or a heat-sealing layer made of a plastic having a Vicat softening point lower than that of the plastic film (C) and that of the EVOH (A) may be laminated on the both sides which may be printed, in order to obtain a sufficient heat-sealing strength, and to use as a packaging material having good heat-sealing properties. The thickness of the heat-sealing layer is selected ad libitum according to the weight of the content, and is generally 20-150 μm.

For laminating the heat-sealing layer, there are proposed methods including a method comprising dry laminating or polysandwich laminating the multi-layer construction film of the present invention mentioned above with a film made of a plastic having a Vicat softening point lower than that of the plastic film (C) and EVOH (A), or a multilayered plastic film having a low Vicat softening point of at least the surface to be laminated, and a method comprising finally extrusion laminating a plastic having a low Vicat softening point with the multi-layer construction film of the present invention, or co-extrusion laminating a molten multilayered polymer having a low Vicat softening point of at least the surface to be heat-sealed, with the multi-layer construction film of the present invention.

The plastic having a low Vicat softening point which is to be used as a heat-sealing layer includes polypropylene, polyethylene, polyester, polyamide, and polyacrylonitrile, which may be used solely or in combination of one another in a blend.

These plastics may contain various additives such as antioxidants, colorants, ultraviolet absorbers, slipping agents, antistatic agents, plasticizers, crosslinking agents, inorganic fillers, and inorganic desiccants, and various resins such as thermoplastic resins to the extent that they do not adversely affect the present invention.

Examples of the polypropylene to be used as the heat-sealing layer include homopolymers of propylene, copolymers of propylene as the main component, and ethylene, butene-1,5-ethylidene-2-norbornene, 5-methylene-2-norbornene, or 1,4-hexadiene, and those subjected to graft modification using a carboxylic acid such as maleic anhydride.

Examples of the polyethylene to be used as the heat-sealing layer include high-density polyethylene, medium-density polyethylene and low-density polyethylene which are homopolymers of ethylene, and copolymers of ethylene as the main component, and propylene, butene-1, 4-methylpentene-1, 1-hexene, 1-octene, 5-ethylidene-2-norbornene, 5-methylene-2-norbornene, vinyl acetate, butyl acetate, methyl acrylate, ethyl acrylate, acrylic acid, methyl methacrylate, ethyl methacrylate, or methacrylic acid. Of the above-mentioned copolymers, copolymers with acrylic acid or methacrylic acid may be crosslinked by sodium, zinc, or aluminium, and vinyl acetate component of the copolymers with vinyl acetate may be saponified partially or completely. The polyethylene may be subjected to graft modification with a carboxylic acid such as maleic anhydride.

Examples of the polyester to be used as the heat-sealing layer include polyesters obtained from a polyhydric alcohol component such as ethylene glycol, diethylene glycol, trimethylene glycol, propylene glycol, 1,4-butanediol, neopentyl glycol, 1,4-cyclohexane dimethanol, 4,4'-dihydroxydiphenyl-2,2-propane, glycerin, and pentaerythritol, a hydroxycarboxylic acid component such as p-hydroxy benzoic acid, δ-valerolactone, ε-caprolactone, and tartaric acid, a polyvalent carboxylic acid or its ester component such as terephthalic acid, isophthalic acid, various naphthaline dicarboxylic acid, azelaic acid, sebacic acid, pimelic acid, adipic acid, glutaric acid, and succinic acid, as starting materials.

The polyamide to be used as the heat-sealing layer is exemplified by polyamides obtained from a diamine component such as hexamethylenediamine, piperazine, tetramethylenediamine, ethylenediamine, and methaxylylenediamine, an aminocarboxylic acid component such as δ-valerolactam, ε-caprolactam, ω-laurolactam, ω-aminoundecanoic acid, and ω-aminododecanoic acid, and a polyvalent carboxylic acid component such as various naphthaline dicarboxylic acids, terephthalic acid, isophthalic acid, azelaic acid, sebacic acid, pimelic acid, adipic acid, glutaric acid, and succinic acid, as starting materials.

The polyacrylonitrile to be used as the heat-sealing layer is exemplified by copolymers of acrylonitrile as the main component, and stylene, methyl methacrylate, methyl acrylate, ethyl methacrylate, ethyl acrylate, or butadiene.

The layer construction of the multi-layer construction film of the present invention is typically exemplified by C/B/A, C/B/A/B, C/B/A/B/A, and those applied with a heat-sealing layer mentioned above on one side or both sides of the films which has the aforementioned layer construction. The multi-layer construction film thus obtained is useful as various packaging materials for foods and medicines, and is particularly useful for bag-in-box packaging which requires flex resistance.

The present invention is hereinbelow detailedly described by examples, to which the invention is not limited. In the examples, "part" and "%" are both on a weight basis unless otherwise specified.

EXAMPLE 1

A multi-layer construction film having a thickness of layer (A) and layer (B) of 2 μm, respectively, was obtained by co-extrusion coating of EVOH (A) (250° C. molten, ethylene content: 27 mol %, saponification degree of vinyl acetate component: 99.6 mol %, MFR: 7.0 g/10 min., Vicat softening point: 180° C.), and APO (B) (220° C. molten, density: 0.88 g/cm$^3$, MFR: 8.0 g/10 min.) obtained by a graft reaction using maleic anhydride (0.1 wt %), of a copolymer of ethylene (75 mol %) as the main component, and propylene (25 mol %), and a 20 μm-thick biaxially stretched polypropylene film (OPP) having an orientation ratio of 50 times (available from Tokyo Cellofan Co., Ltd., Tohcello OP U-1, Vicat softening point: 150° C.) (C) by the feed block (Cloren) at a speed of 50 m/min. in a manner that the APO (B) layer contacts the OPP (C).

Using Gelbo flex tester (Rigaku Kogyo Co. Ltd.), the number of flexings which cause one pinhole upon flexing at 20° C. was measured by flexing a film of the size A-4 given times, counting pinholes developed on the film, making a correlation diagram of the number of flexings and the number of the pinholes, and determining the number of flexings necessary for one pinhole from the regression curve, which is hereinafter abbreviated as $N_p=1$. The number of flexings of OPP was 1800, while that of the multi-layer construction film was 2200. The laminating strength (T-shape peeling speed: 250 mm/min., sample width: 15 mm) between OPP and APO, and APO and EVOH was so great that measurement could not be made due to the material failure of the coated film.

An adhesive for dry laminating (a mixture of Takelac A-385 and Takenate A-50 at a ratio of 6:1, Takeda Chemical Industries, Ltd.) was applied on the EVOH surface of the thus-obtained multi-layer construction film at 3 g/m$^2$ on a solid basis. After evaporating the solvent, the film was laminated with a 60 μm-thick low-density polyethylene film (Suzulon L S-210, Vicat softening point: 95° C., Aicello Chemical Co., Ltd., hereinafter abbreviated as LDPE) at a laminating speed of 50 m/min. The gas barrier properties of this film expressed by OTR was fine and was 2 cc/m$^2$·day·atm (measured by OX-TRAN 10/50A, Modern Control Co., Ltd. at 20° C., humidity: 65%).

The film thus obtained was manufactured into a bag of 230 mm length, and 150 mm width at side-sealing temperature of 155° C., bottom sealing temperature of 160° C., and a manufacture speed of 60 bags/min. Then, water (100 ml) was filled therein, followed by sealing by an impulse sealer to give a four-sided bag. The bag was boiled at 98° C. for 30 minutes. As a result, change of appearance such as delamination was not observed, which result proves its good resistance to boiling. A one-month exposure to a fluorescent light did not cause yellowing of the film.

COMPARATIVE EXAMPLE 1

The procedure of Example 1 was repeated except that an APO (250° C. molten, density: 0.91 g/cm$^3$, MFR: 12 g/10 min.) made of a linear low-density polyethylene obtained by a graft reaction using maleic anhydride (0.07 wt %), of a copolymer of ethylene as the main component (95 mol %), and 4-methyl-1-pentene (5 mol %) was used in place of the APO of ethylene as the main component (220° C. molten, density: 0.88 g/cm$^3$, MFR: 8.0 g/10 min.).

The laminating strength between the OPP and the APO was not higher than 20 g/15 mm, which result indicates absence of adhesion.

COMPARATIVE EXAMPLE 2

An adhesive for dry laminating (a mixture of Takelac A-385 and Takenate A-50 at a ratio of 6:1, Takeda Chemical Industries, Ltd.) was applied on a 12 μm-thick biaxially stretched polyethylene terephthalate film (PET) (H-500, Vicat softening point 240° C., Dia Foil Co., Ltd.) having an orientation ratio (area) of 9 times, at 3 g/m$^2$ on a solid basis. After evaporating the solvent at 70° C., it was laminated with a 15 μm-thick biaxially stretched EVOH film (EF-XL, Kuraray Co., Ltd.) at a laminating speed of 20 m/min. Then, an adhesive for dry laminating was applied thereon at 3 g/m$^2$ on a solid basis. After evaporating the solvent, it was laminated with a 60 μm-thick LDPE at a laminating speed of 20 m/min., followed by aging at 40° C. for 3 days. The film thus obtained was manufactured into a bag in the same manner as in Example 1, and the bag was subjected to a boiling test at 98° C. for 30 minutes. As a result, delamination occurred on the entire surface.

COMPARATIVE EXAMPLE 3

An adhesion promoter (AD-503/CAT-10A-50 mixed at a ratio of 100:4.5, Toyo Moton) was applied on a 20 μm-thick OPP (Tohcello OP U-1, Tokyo Cellofan Co., Ltd.) at 0.2 g/m² on a solid basis. After evaporating the solvent, the film was sandwich-laminated with a 60 μm-thick LDPE, APO (250° C. molten, density: 0.92 g/cm³, MFR: 2.0 g/10 min.) obtained from a low-density polyethylene as the main component, and EVOH (250° C. molten, ethylene content: 32 mol %, saponification degree of vinyl acetate component: 99.5 mol %, MFR: 20 g/10 min., Vicat softening point: 170° C.) by the feed block (Cloren) at a laminating speed of 15 m/min. in a manner that the thickness of each layer was 10 μm and the EVOH contacts the OPP. The film thus obtained had woodgrain patterns due to the thick spots in each layer, and had poor appearance. Moreover, its $N_P=1$ was 700, which was markedly less than 1800 of OPP.

EXAMPLE 2

The procedure of Example 1 was repeated except that a multi-layer construction film having a thickness of layer (A) and layer (B) of 4 μm, respectively, was obtained by co-extrusion coating of a 15 μm-thick OPA (C) (Bonyl R, Vicat softening point: 205° C., Co. Kohjin) having an orientation ratio (area) of 9 times, EVOH (A) (250° C. molten, ethylene content: 47 mol %, saponification degree of vinyl acetate component: 99.5 mol %, MFR: 25 g/10 min.), and APO (B) (240° C. molten, density: 0.89 g/cm³, MFR: 16 g/10 min.) obtained by a graft reaction using maleic anhydride (0.2 wt %), of a copolymer of ethylene (80 mol %) as the main component, and propylene (20 mol %), by the feed block (Cloren) at a co-extrusion coating speed of 120 m/min., in a manner that the APO (B) contacts the OPP (C), instead of the co-extrusion coating of EVOH (A) (250° C. molten, ethylene content: 27 mol %, saponification degree of vinyl acetate component: 99.6 mol %, MFR: 7.0 g/10 min., Vicat softening point: 145° C.), and APO (B) (220° C. molten, density 0.88: g/cm³, MFR: 8.0 g/10 min.) produced by a graft reaction using maleic anhydride, of a copolymer obtained from ethylene as the main component, and propylene, with a 20 μm-thick OPP by the feed block (Cloren) at a co-extrusion coating speed of 50 m/min. in a manner that the thickness of each layer was 2 μm and the APO contacts the OPP. The $N_p=1$ was 4200 for OPA, and 4500 for the obtained multi-layer construction film, and gas barrier properties expressed by OTR of the obtained multi-layer construction film was 13 cc/m²·day·atm, and both results were fine. Furthermore, this multi-layer construction film was laminated with an LDPE film, and subjected to a 30 minutes' boiling test at 98° C. As a result, no delamination was observed. A one-month exposure to a fluorescent light did not cause yellowing of the film.

COMPARATIVE EXAMPLE 4

A multi-layer construction film was obtained in the same manner as in Example 1 except that the thickness of the EVOH (A) was 4 μm, and that of the APO (B) layer was 40 μm. The multi-layer construction film thus obtained had rib-like patterns caused by the heat on OPP, and was poor in appearance. A boiling test of a bag made therefrom resulted in delamination due to the disturbance of the APO layer.

EXAMPLE 3

The procedure of Example 1 was repeated except that a multi-layer construction film having a thickness of layer (A) and layer (B) of 4 μm, repectively, was obtained by co-extrusion coating of a 15 μm-thick OPA (C) (Bonyl R, Vicat softening point: 205° C., Co. Kohjin), EVOH (A) (250° C. molten, ethylene content: 47 mol %, saponification degree of vinyl acetate component: 99.5 mol %, MFR: 25 g/10 min.), and APO (B) (240° C. molten, density: 0.90 g/cm³, MFR: 12 g/10 min.) obtained by a graft reaction using maleic anhydride (0.26 wt %), of a copolymer of ethylene (82 mol %) as the main component, and butene (18 mol %), by the feed block (Cloren) at a co-extrusion coating speed of 80 m/min., in a manner that the APO (B) contacts the OPP (C), instead of the co-extrusion coating of EVOH (A) (250° C. molten, ethylene content: 27 mol %, saponification degree of vinyl acetate component: 99.6 mol %, MFR: 7.0 g/10 min., Vicat softening point: 145° C.), and APO (B) (220° C. molten, density 0.88: g/cm³, MFR: 8.0 g/10 min.) produced by a graft reaction using maleic anhydride, of a copolymer obtained from ethylene as the main component, and propylene, with a 20 μm-thick OPP by the feed block (Cloren) at a co-extrusion coating speed of 50 m/min. in a manner that the thickness of each layer was 2 μm and the APO contacts the OPP. The $N_p=1$ was 4200 for OPA, and 4100 for the obtained multi-layer construction film, and gas barrier properties expressed by OTR of the obtained multi-layer construction film was 13 cc/m²·day·atm, and both results were fine. Furthermore, this multi-layer construction film was laminated with an LDPE film, and subjected to a 30 minutes' boiling test at 98° C. As a result, no delamination was observed. A one-month exposure to a fluorescent light did not cause yellowing of the film.

TABLE 1

| Item and unit | Example 1 | Comp. Ex. 1 | Comp. Ex. 2 |
|---|---|---|---|
| (A) | | | |
| $\eta E$ (g/10 min.) | 7.0 | 7.0 | — |
| a (μm) | 2 | 2 | 15 |
| (B) | | | |
| density (g/cm³) | 0.88 | 0.91 | 0.92 |
| $\eta A$ (g/10 min.) | 8.0 | 12 | — |
| b (μm) | 2 | 2 | 60 |
| b' (μm) | 2 | 2 | 60 |
| $\eta E/\eta A$ | 0.88 | 0.58 | — |
| (C) | OPP | OPP | PET |
| Adhesive | none | none | used |
| Flex resistance, number of flexings | | | |
| c | 1800 | 1800 | 350 |
| d | 2200 | 1600 | 150 |
| Appearance of film | fine | fine | fine |
| Adhesiveness between C and B (g/15 mm) | no peeling | not higher than 20 | — |
| OTR (cc/m²·day·atm) | 2 | 2 | 0.3 |
| Appearance after boiling at 98° C. for 30 min. | fine | delamination | delamination |
| Change after one-month exposure to fluorescent light | no yellowing | no yellowing | no yellowing |

TABLE 2

| Item and unit | Comp. Ex. 3 | Ex. 2 | Comp. Ex. 4 | Ex. 3 |
|---|---|---|---|---|
| (A) | | | | |
| $\eta E$ (g/10 min.) | 20 | 25 | 7 | 25 |
| a (μm) | 10 | 4 | 4 | 4 |
| (B) | | | | |
| density (g/cm³) | 0.92 | 0.89 | 0.88 | 0.90 |
| $\eta A$ (g/10 min.) | 2 | 16 | 8.0 | 12 |
| b (μm) | 10 | 4 | 40 | 4 |
| b' (μm) | 10 | 4 | 40 | 4 |
| $\eta E/\eta A$ | 10 | 1.56 | 0.88 | 3 |
| (C) | OPP | OPA | OPP | OPA |
| Adhesive | used | none | none | none |
| Flex resistance, number of flexings | | | | |
| c | 1800 | 4200 | 1800 | 4200 |
| d | 700 | 4500 | 2000 | 4100 |
| Appearance of film | woodgrain pattern | fine | rib-like pattern | fine |
| Adhesiveness between A and B (g/15 mm) | — | no peeling | no peeling | no peeling |
| OTR (cc/m² · day · atm) | 0.4 | 13 | 12 | 13 |
| Appearance after boiling at 98° C. for 30 min. | slight delamination | fine | slight delamination | fine |
| Change after one-month exposure to fluorescent light | no yellowing | no yellowing | no yellowing | no yellowing |

As has been described in the above, a multi-layer construction film having gas barrier properties, flex resistance, and resistance to boiling, which is scarcely yellowed by ultraviolet rays can be obtained according to the present invention.

What is claimed is:

1. A multi-layer construction film comprising at least one layer (A) of ethylene-vinyl alcohol copolymer and having an ethylene content of 20–60 mol %, and a melt index of $\eta E$ g/10 min., at least one adhesive resin layer (B) of ethylene polymer and having a melt index of $\eta A$ g/10 min. and density of not more than 0.90 g/cm³, and a plastic film (C) wherein the layer (B) is laminated adjacent to the plastic film (C), which satisfies the following formulas:

$$0.5 \mu m \leqq a \leqq 20 \mu m \quad (1)$$

$$0.5 \mu m \leqq b' \leqq 20 \mu m \quad (2)$$

$$1 \mu m \leqq a+b \leqq 30 \mu m \quad (3)$$

$$0.08 \leqq \eta E/\eta A \leqq 8 \quad (4)$$

wherein a is the thickness of the entire layer (A), b is the thickness of the entire layer (B), and b' is the thickness of one layer of layer (B).

2. A multi-layer construction film according to claim 1, wherein the saponification degree of the vinyl ester component of the ethylene-vinyl alcohol copolymer constituting the layer (A) is not less than 90 mol %.

3. A multi-layer construction film according to claim 1, wherein the adhesive resin layer (B) of ethylene polymer is obtained by graft modification using maleic anhydride, of a copolymer of ethylene and one or more selected from the group consisting of propylene, butene and 4-methylpentene, and has a density of not higher than 0.90 g/cm³.

4. A multi-layer construction film according to claim 1, which satisfies the mathematical expression $0.5 \times c \leqq d$, wherein the number of flexings necessary for the occurrence of one pinhole on the plastic film (C) upon flexing at 20° C. as measured by Gelbo flex tester is c, and the number of flexings necessary for the occurrence of one pinhole on the multi-layer construction film upon flexing at 20° C. as measured by Gelbo flex tester is d.

5. A multi-layer construction film according to claim 1, wherein the plastic film (C) is selected from the group consisting of biaxially stretched polypropylene films having an orientation ratio (area) of not less than 10 times, biaxially stretched or rolled high-density polyethylene films having an orientation ratio (area) of not less than 4 times, biaxially stretched nylon films, and biaxially stretched polyethylene terephthalate films.

6. A multi-layer construction film according to claim 1, wherein a heat-sealing layer of a plastic having a Vicat softening point lower than that of the plastic film (C) is laminated on the side opposite to the (C) layer, or a heatsealing layer of a plastic having a Vicat softening point lower than that of the layer (A) of ethylene-vinyl alcohol copolymer is laminated on the side of the (C) layer, or a heat-sealing layer of a plastic having a Vicat softening point lower than that of the plastic film (C) and the layer (A) of ethylene-vinyl alcohol copolymer is laminated on the both sides.

7. A multi-layer construction film comprising at least one layer (A) of ethylene-vinyl alcohol copolymer having an ethylene content of 20–60 mol %, a saponification degree of the vinyl ester component of the ethylene-vinyl alcohol copolymer not less than 90 mol % and a melt index of $\eta$ Eg/10 min; at least one adhesive resin layer (B) of ethylene polymer and having a melt index of $\eta$ Ag/10 min and a density of not more than 0.90 g/cm³, and a plastic film (C) wherein the layer (B) is laminated adjacent to the plastic film (C), which satisfies the following formulas:

$$0.5 \mu m \leqq a \leqq 20 \mu m \quad (1)$$

$$0.5 \mu m \leqq b' \leqq 20 \mu m \quad (2)$$

$$1 \mu m \leqq a+b \leqq 30 \mu m \quad (3)$$

$$0.08 \leqq \eta E/\eta A \leqq 8 \quad (4)$$

wherein a is the thickness of the entire layer (A), b is the thickness of the entire layer (B), and b' is the thickness of one layer of layer (B).

* * * * *